United States Patent [19]
Kawamura

[11] Patent Number: 5,970,944
[45] Date of Patent: Oct. 26, 1999

[54] COMBUSTION CHAMBER STRUCTURE IN ENGINES

[75] Inventor: Hideo Kawamura, Samukawa-machi, Japan

[73] Assignee: Isuzu Ceramics Research Institute Co., Ltd., Kanagawa-Ken, Japan

[21] Appl. No.: 08/990,787

[22] Filed: Dec. 15, 1997

[30] Foreign Application Priority Data

Jan. 21, 1997 [JP] Japan .................................. 9-020935
Jan. 21, 1997 [JP] Japan .................................. 9-020936

[51] Int. Cl.⁶ .................................................. F02B 19/02
[52] U.S. Cl. .................... 123/258; 123/316; 123/48 AA; 123/275; 123/292
[58] Field of Search ..................... 123/316, 527, 123/258, 274, 275, 270, 271, 292, 48 A, 48 AA, 48 D

[56] References Cited

U.S. PATENT DOCUMENTS

| | | | |
|---|---|---|---|
| 4,091,772 | 5/1978 | Heater et al. | 123/258 |
| 4,271,810 | 6/1981 | Lancaster | 123/258 |
| 4,406,260 | 9/1983 | Burley | 123/258 |
| 4,516,537 | 5/1985 | Nakahara et al. | 123/48 AA |
| 4,787,341 | 11/1988 | Chivato | 123/48 D |
| 4,987,863 | 1/1991 | Daly | 123/48 AA |
| 5,293,851 | 3/1994 | Schaub | 123/275 |
| 5,555,868 | 9/1996 | Neumann | 123/275 |

FOREIGN PATENT DOCUMENTS

| | | | |
|---|---|---|---|
| 29 10 273 | 9/1980 | Germany | 123/258 |
| 54-156911 | 12/1979 | Japan . | |
| 63-006358 | 1/1988 | Japan . | |
| 1-232119 | 9/1989 | Japan . | |
| 3-041068 | 8/1991 | Japan . | |
| 7-158448 | 6/1995 | Japan . | |

Primary Examiner—Erick R. Solis
Attorney, Agent, or Firm—Browdy and Neimark

[57] ABSTRACT

To minimize an increase in friction during the compression stroke, a part of the force to compress the air in the main combustion chamber is stored as a spring force to prevent an excess rise of compressed air pressure in the main combustion chamber and to keep low the pressure difference between the main combustion chamber and the pre-combustion chamber. The spring force stored in the spring is recovered as a work during the power stroke to reduce the energy that is used in the form of friction and heat, thereby improving the utilization of air in the main combustion chamber, increasing the combustion speed in the main combustion chamber, shortening the combustion period. By applying the spring force stored in the spring to the piston as a work, the fuel cost is reduced.

12 Claims, 4 Drawing Sheets

COMBUSTION CHAMBER STRUCTURE IN ENGINES

BACKGROUND OF THE INVENTION

1. Field of the Invention

The present invention relates to a combustion chamber structure in engines and more particularly to a combustion chamber structure in engines, in which a gas fuel such as natural gas is supplied into a pre-combustion chamber, air drawn in is supplied into a main combustion chamber and compressed and, near the top dead center on the compression stroke, the compressed air and the gas fuel are mixed and ignited for combustion.

2. Description of the Prior Art

In recent years, engines using gas fuels such as natural gas as a main fuel are being developed for use with cogeneration systems and automobiles. The cogeneration systems produces electric energy from the engine power through a generator and at the same time utilize thermal energy of exhaust gas to heat water by a heat exchanger for hot-water supply. The cogeneration systems are expected to find applications as electric power supply systems in hotels, hospitals and offices. When natural gas fuel engines are used on motor vehicles, their advantage is a low combustion temperature which makes production of NOx difficult, contributing to lowering air pollution.

Engines using natural gas as a fuel include those disclosed in, for example, Japanese Patent Laid-Open No. 156911/1979, 6358/1988 and 232119/1989, Japanese Utility Model Publication No. 41068/1991 and Japanese Patent Laid-Open No. 158448/1995.

The natural gas engine of Japanese Patent Laid-Open No. 158448/1995, for example, has a pre-combustion chamber formed in the cylinder head and a main combustion chamber formed in the cylinder, both communicating with each other through a communication port, with a control valve installed in the communication port. The pre-combustion chamber is connected with a gas chamber through a throttled portion in the cylinder head. The gas chamber is formed with a gas introducing port to supply the natural gas through a gas passage into the precombustion chamber. A gas introducing valve is provided at the gas introducing port formed in the gas chamber and opens when the communication port is closed by the control valve, which opens the communication port near the end of the compression stroke. With the gas introducing valve open, the natural gas is supplied into the gas chamber and stays in the gas chamber and near the throttled portion.

Gas engines in general have conventionally employed a system, because of its simplicity, in which a gas fuel such as natural gas is drawn in from an intake valve, compressed and ignited in the same way as at gasoline fuel. Such gas engines are prone to knocking, which prevents the compression ratio from being increased, so that their theoretical thermal efficiency is not necessarily high.

Because of a poor ignition performance of the gas engine when the fuel is compressed and ignited, it was conceived to form the combustion chamber in a heat insulating structure and perform diesel-combustion to improve the thermal efficiency. As a means to improve the thermal efficiency, the gas engine employs the heat insulating structure for the combustion chamber to convert an exhaust gas energy into a driving power.

Because the gas engine uses a gas such as natural gas as a fuel, however, when a mixture of gas and air is drawn in on the intake stroke and then compressed in a combustion chamber made in the heat insulating structure, the temperature of the mixture highly compressed inside the cylinder becomes abnormally high, making a self-ignition phenomenon or knocking likely to occur. It is known that the thermal efficiency of engines theoretically decreases with a decrease in compression ratio.

Further, because the heat insulating type engine recovers the exhaust gas energy, when the mixture of gas and air is drawn in on the intake stroke and then highly compressed, the temperature inside the cylinder becomes excessively high rendering the self-ignition phenomenon or knocking likely to take place.

The engine with a combustion chamber of a heat insulating structure, because of an abnormally high wall surface temperature of the combustion chamber, has an increased risk of self-ignition, a phenomenon in which the fuel supplied into the combustion chamber becomes ignited before an intended firing timing. Thus, in a heat insulating engine which is set to a high compression ratio, when the air drawn from the intake valve and the fuel gas supplied from the fuel passage are mixed and compressed to a high pressure, the self-ignition will occur, initiating combustion long before the top dead center, causing knocking and making the engine inoperable.

Although the heat efficiency of the engine that burns a gaseous fuel such as natural gas in a diesel cycle can be increased by compressing the natural gas to a high pressure before injecting it into the combustion chamber, this method has disadvantages, which include the fact that compressing the gas such as natural gas to 25–30 MPa entails increased equipment cost and that injecting the gas under high pressure increases NOx emissions, offsetting the economical advantage of mileage improvement by diesel combustion.

Under these circumstances, the conventional gas engines have been made in a configuration in which a combustion chamber is formed into a main combustion chamber and a pre-combustion chamber, both connected to each other through a communication port having a control valve installed therein; whereby a gaseous fuel such as natural gas is supplied into the combustion chamber without compressing the gas fuel to a high pressure; air is supplied into the main combustion chamber in the cylinder during the intake stroke and then compressed on the compression stroke; and the gas fuel is supplied into the pre-combustion chamber during the intake or exhaust stroke and, in the latter half of the compression stroke in which the piston is moving up, the control valve is opened to introduce compressed air from the main combustion chamber into the pre-combustion chamber to mix the air with the gas fuel, after which the mixture is ignited for diesel combustion, thereby increasing the heat efficiency.

In the above gas engine, where the control valve is operated in the second half of the compression stroke to open the communication port connecting the main combustion chamber and the pre-combustion chamber, the pressure of the air compressed in the main combustion chamber during a period up to the opening by the control valve of the communication port rises excessively as the compression stroke advances past its half point toward its end, with the result that increased friction and heat of the compressed air cause an increase in heat loss. The compressed air in the main combustion chamber flows into the pre-combustion chamber at high speed by the pressure difference between the main combustion chamber and the pre-combustion chamber. Although the compressed air pressure in the main combustion chamber is raised to a high level, the communication between the main combustion chamber and the pre-combustion chamber reduces the compressed air pressure, consequently reducing the work of the compressed air by the lower pressure of the gas, deteriorating the mileage to that extent.

In a gas engine with the compression ratio set to 15 to 17, as the piston nears the top dead center with the pre-combustion chamber and the main combustion chamber isolated from each other by the control valve closing the communication port, the compressed air in the main combustion chamber reaches a high pressure 1.7–2 times that of an engine without the control valve. When in this state the communication port is opened, not only does the pressure in the main combustion chamber decrease but also the friction and heat applied to the piston by the high compressed air pressure constitute a negative work, deteriorating the mileage.

Thus, with the gas engine, to limit the pressure of air compressed in the main combustion chamber to not so high a level on the compression stroke and thereby prevent it from being consumed as friction and heat, a part of the compressed air pressure is stored as a spring force, which during the power stroke can be returned to the working fluid that performs a work on the piston. This is considered to improve the mileage.

SUMMARY OF THE INVENTION

An object of this invention is to solve the problem described above and to provide a combustion chamber structure in an engine, which, to reduce an increase in friction and heat produced during the compression stroke, stores a part of the force used to compress air in the main combustion chamber as a spring force to prevent the compressed air pressure in the main combustion chamber from rising excessively and thereby limit the pressure difference between the main combustion chamber and the pre-combustion chamber to a small value, and which releases the stored spring force and the compressed air pressure as a work during the power stroke to reduce the energy consumed in the form of friction and heat and to make the compressed air in the main combustion chamber contribute to the combustion, thus enhancing the utilization of air in the main combustion chamber, increasing the combustion speed to shorten the combustion period, and returning the stored spring force to the piston as a work to reduce fuel cost.

In order to store a part of the force used to compress the air in the main combustion chamber as a spring force, this combustion chamber structure has installed in the main combustion chamber an air chamber (pressure reduction chamber) that has a spring-urged subpiston. During the compression stroke, a part of the air compressed in the main combustion chamber is stored in the pressure reducing chamber against the force of the spring. Then, during the power stroke, the compressed air stored in the pressure reducing chamber is ejected out into the main combustion chamber by the spring force so that the ejected compressed air can be recovered to perform a work on the piston.

Alternatively, in order to store a part of the force used to compress the air in the main combustion chamber as a spring force, this combustion chamber structure has provided in a cavity in the piston a displacement-variable main combustion chamber portion that includes a movable head member. During the compression stroke, a part of the air compressed in the main combustion chamber is stored in the displacement-variable main combustion chamber portion against the force of the spring. Then, during the power stroke, the air and combustion gas is pushed out from the displacement-variable main combustion chamber portion by the spring force stored in the displacement-variable main combustion chamber portion to perform a work on the piston.

This invention concerns a combustion chamber structure in engines, which comprises:

pre-combustion chamber members installed in a cylinder head and forming pre-combustion chambers and communication ports;

combustion chamber members forming main combustion chambers communicating with the pre-combustion chambers through the communication ports;

pistons reciprocating in cylinders forming the main combustion chambers;

fuel supply passages to supply gaseous fuel to the pre-combustion chambers;

control valves to open and close the communication ports;

fuel valves to open and close the fuel supply passages; and displacement-variable pressure reducing chambers opening to the main combustion chambers and incorporating subpistons urged by spring forces;

wherein, during the compression stroke, a part of compressed air in the main combustion chambers is stored in the pressure reducing chambers by displacing the subpistons against the spring forces and, during the power stroke, the compressed air in the pressure reducing chambers is ejected into the main combustion chambers by driving the subpistons by the spring forces.

The control valves are set to open the communication ports near the end of the compression stroke and to close the communication ports by the end of the exhaust stroke, and the fuel valves are open when the communication ports are closed to supply the gaseous fuel from the fuel supply passages to the pre-combustion chambers.

Communication ports between the pressure reducing chambers and the main combustion chambers are set to be closed by head portion side surfaces of the pistons during a period from the second half of the compression stroke of the pistons to the first half of the power stroke.

The pressure reducing chambers are formed of pressure reducing chamber members installed in the cylinder head and springs are installed at the back of the subpistons adapted to slide in cylinders in the pressure reducing chamber members.

The main combustion chambers are made of the combustion chamber members of heat resisting ceramics and formed in a heat insulating structure, the pre-combustion chambers are made of the pre-combustion chambers members of heat resisting ceramics and formed in a heat insulating structure, and the pressure reducing chambers are formed in a heat insulating structure.

Because of the pressure reducing chamber of the above construction, the combustion chamber structure of this invention can prevent an excess rise in the cylinder pressure, store the compressed air pressure as the spring force in the pressure reducing chamber, minimize energy consumed by the piston in the form of friction, and recover the compressed air stored as the spring force to perform a work during the power stroke, thus improving the thermal efficiency.

That is, when a spring is not provided in the pressure reducing chamber as it is not with the conventional engines, the compression ratio decreases and a waste volume increases, deteriorating the thermal efficiency. However, the engine of this invention has a spring in the pressure reducing chamber and thus can avoid such disadvantages. Further, the clearance between the outer circumferential surface of the piston and the cylinder wall surface works as a throttle, which means that the compressed air in the pressure reducing chamber and the compressed air in the cylinder are isolated from each other near the top dead center. The clearance therefore does not pose any problem.

The combustion chamber structure of this invention works as follows. While the communication port that connects the main combustion chamber and the pre-combustion chamber is closed by the control valve, the fuel valve is opened to supply gaseous fuel to the pre-combustion chamber. The air drawn into the main combustion chamber during the intake stroke is compressed on the compression stroke, during which time a part of the compressed air is stored in the pressure reducing chamber. After the top surface of the piston has closed the communication port of the pressure reducing chamber, the compressed air present in the main combustion chamber is further compressed. In this way, the pressure of the compressed air as a whole is prevented from rising excessively, thus minimizing an increase in friction and heat. Then, the control valve is opened to introduce the compressed air from the main combustion chamber into the pre-combustion chamber, mixing the compressed air and the gaseous fuel in the pre-combustion chamber and igniting the mixture, with the result that the gas containing flames and unburned mixture is ejected out from the pre-combustion chamber into the main combustion chamber to cause the piston to perform a work. Next, in the first half of the power stroke, when the communication port of the pressure reducing chamber is open to the main combustion chamber, the subpiston is moved by the spring force to push out the compressed air from the pressure reducing chamber to promote combustion and work.

This combustion chamber structure has no air in the pre-combustion chamber and thus the gaseous fuel does not self-ignite and therefore prevents knocking. Because there is no gaseous fuel in the main combustion chamber, the air can be compressed to a predetermined pressure. The combustion chamber structure of this invention performs combustion by involving air present in the main combustion chamber and in the pressure reducing chamber, improving the utilization of air, enhancing the combustion speed and shortening the combustion period. This in turn allows the combustion to be completed in a short period of time, reducing the amount of NOx and HC emissions, increasing the thermal efficiency, preventing self-ignition of gas fuel and therefore knocking.

Because the combustion chamber structure of this invention has an air chamber or pressure reducing chamber formed in a part of the main combustion chamber, a part of the compressed air is stored in the pressure reducing chamber in the second half of the compression stroke to prevent the pressure of the compressed air in the main combustion chamber from rising excessively near the end of the compression stroke. This limits an increase in the work done during the compression stroke. Because the pressure in the main combustion chamber is prevented from becoming too high, the durability of the combustion chamber member improves. If the pressure reducing chamber and a communication port to connect the pressure reducing chamber and the main combustion chamber are formed in the cylinder head near the head underside portion, the subpiston in the pressure reducing chamber is pushed by the pressure that increases as the piston moves up, thus preventing the pressure in the cylinder or main combustion chamber from rising abnormally high. Near the top dead center on the compression stroke, the communication port is closed by the piston and thus the pressure reducing chamber is not affected by the sharp rise in the pressure that occurs by the combustion near the top dead center, so that the pressure rise in the main combustion chamber is converted into a work in a desirable condition. In the intermediate and latter part of the combustion process, the air in the air chamber is ejected into the burning gas to promote combustion in the latter stage.

This invention also concerns a combustion chamber structure in engines, which comprises:

pre-combustion chamber members installed in a cylinder head and forming pre-combustion chambers and communication ports opening to the pre-combustion chambers;

combustion chamber members forming main combustion chambers communicating with the pre-combustion chambers through the communication ports;

fuel supply passages to supply gaseous fuel to the pre-combustion chambers;

control valves to open and close the communication ports;

fuel valves to open and close the fuel supply passages;

pistons reciprocating in cylinders;

cavities formed in piston heads of the pistons and forming a part of the main combustion chambers;

movable head members installed in the cavities and supported by spring forces; and displacement-variable main combustion chamber portions;

wherein the displacement-variable main combustion chamber portions change their displacements as the movable head members move in the cavities against the spring forces in response to the gas pressures in the main combustion chambers.

During the compression stroke, the movable head members are moved against the spring forces to expand the displacement-variable main combustion chamber portions to store therein a part of compressed air of the main combustion chambers and, during the power stroke, the compressed air present in the displacement-variable main combustion chamber portions is pushed out into the main combustion chambers by driving the movable head members by the spring forces.

The control valves are set to open the communication ports near the end of the compression stroke and close the communication ports by the second half of the exhaust stroke and the fuel valves are open when the communication ports are closed to supply the gaseous fuel from the fuel supply passages to the pre-combustion chambers.

The movable head members are sealed gas-tightly between them and wall surfaces of the cavities, and gas leakage passages are formed in the piston heads to leak a gas from hollow portions at the back of the movable head members.

The movable head members are elastically supported by springs installed in the cavities at the back of the movable head members.

The main combustion chambers are formed in a heat insulating structure by the combustion chamber members of heat resisting ceramics, the pre-combustion chambers are formed in a heat insulating structure by the pre-combustion chamber members, and the movable head members and the springs elastically supporting the movable head members are made of heat resisting ceramics or heat resisting metal.

In the above combustion chamber structure, while the communication port connecting the main combustion chamber and the pre-combustion chamber is closed by the control valve, the fuel valve is opened to supply gaseous fuel to the pre-combustion chamber. The air drawn into the main combustion chamber during the intake stroke is compressed on the compression stroke, during which time an excessively high air pressure is stored in a spring or the like in the displacement-variable main combustion chamber portion that was expanded against the force of the spring to ensure that the pressure of the compressed air as a whole is prevented from rising excessively, thus minimizing an increase in friction and heat. Then, the control valve is opened to introduce the compressed air from the main combustion chamber into the pre-combustion chamber, mixing the compressed air and the gaseous fuel in the pre-combustion chamber and igniting the mixture, with the result that the gas containing flames and unburned mixture is ejected out from the pre-combustion chamber into the main combustion chamber to cause the piston to perform a work. As the piston moves down on the power stroke, the movable head member is moved by the spring force to eject out the compressed air from the displacement-variable main combustion chamber portion to promote combustion and cause the piston to perform work.

Because the combustion chamber structure of this invention has an air chamber or displacement-variable main combustion chamber portion formed in a part of the main combustion chamber, a part of the compressed air is stored in the displacement-variable main combustion chamber portion in the latter half of the compression stroke to prevent the pressure of the compressed air in the main combustion chamber from rising excessively near the end of the compression stroke. This limits an increase in the work done during the compression stroke. Because the pressure in the main combustion chamber is prevented from becoming too high, the durability of the combustion chamber member improves. If a communication port to connect the main combustion chamber and the displacement-variable main combustion chamber portion is formed near the head underside portion, the movable head member in the displacement-variable main combustion chamber portion is pushed by the pressure that increases as the piston moves up, thus preventing the internal pressure in the cylinder or main combustion chamber from rising abnormally high. Near the top dead center on the compression stroke, the communication port is closed by the piston, so that the displacement-variable main combustion chamber portion is not affected by the sharp rise in pressure caused by the combustion near the top dead center. The pressure rise in the main combustion chamber is therefore converted into a work in a desirable condition. In the intermediate and latter part of the combustion process, the air in the air chamber is ejected into the burning gas to promote combustion in the latter stage.

DETAILED DESCRIPTION OF THE EMBODIMENT

Embodiments of the combustion chamber structure in an engine according to this invention will be described by referring to the accompanying drawings. This combustion chamber structure for the engine can be applied to a cogeneration system or automobile engines.

First, by referring to FIG. 1 and 2, one embodiment of the combustion chamber structure in an engine according to this invention will be explained.

Figure 1:
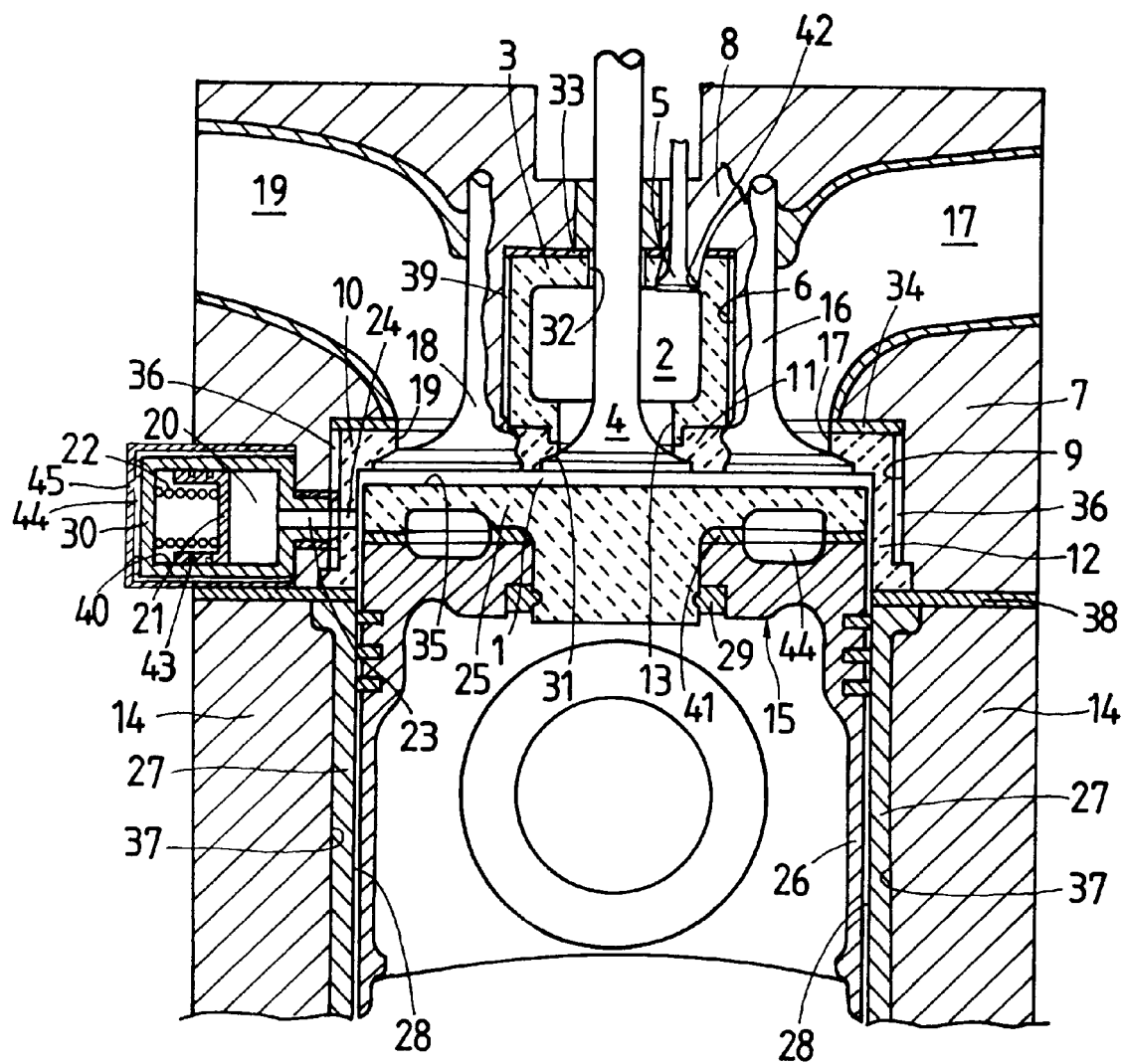
FIG. 1 is a cross section showing one embodiment of the combustion chamber structure in an engine of this invention.
Figure 2:
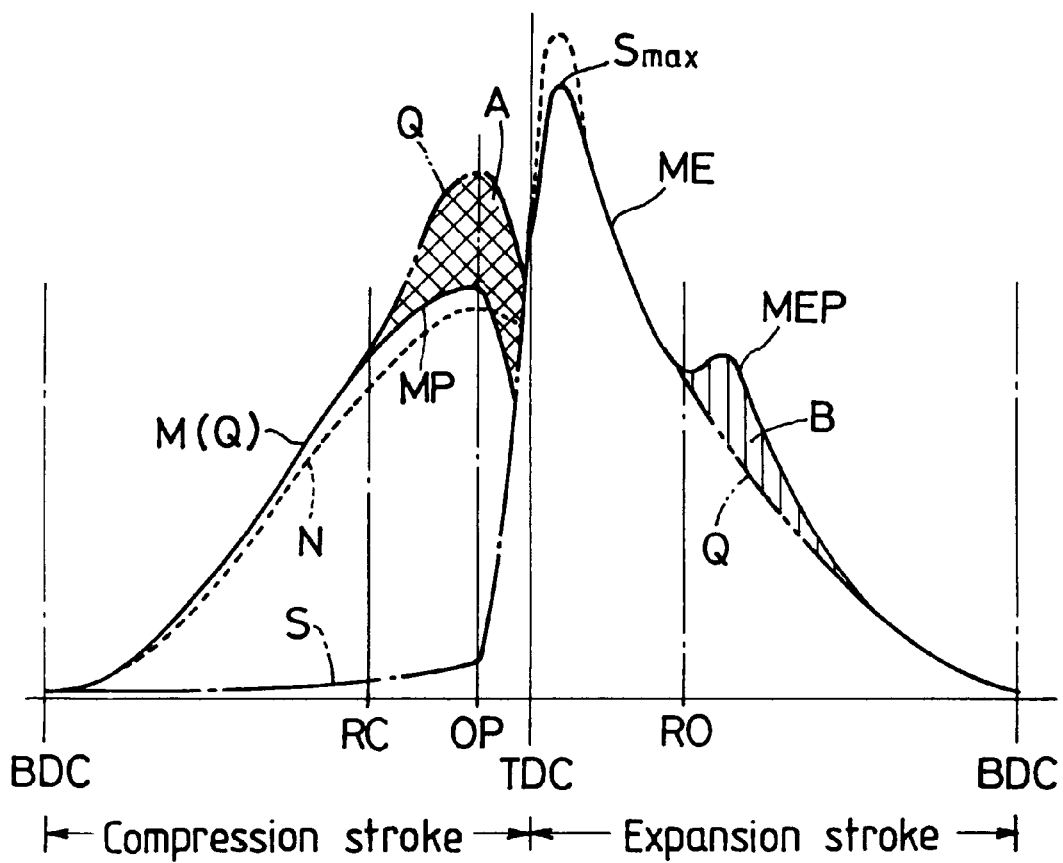
FIG. 2 is a line diagram showing the working of the engine of FIG. 1.

As shown in FIG. 1, this engine includes a cylinder block 14, a cylinder head 7 fixedly mounted on the upper surface of the cylinder block 14 with a gasket 38 interposed therebetween, a cylinder liner 27 fitted in a hole portion 37 in the cylinder block 14 to form a cylinder 28, a piston 15 adapted to reciprocate in the cylinder 28 formed of the cylinder liner 27, a pre-combustion chamber member 3 installed in a small-diameter cavity 6 in the cylinder head 7 to form a pre-combustion chamber 2, and a combustion chamber member 10 installed in a large-diameter cavity 9 in the cylinder head 7 to form a main combustion chamber 1. The main combustion chamber 1 is formed by the cylinder 28 formed in the combustion chamber member 10 and the cylinder 28 formed of the cylinder liner 27.

The combustion chamber member 10 installed in the cavity 9 of the cylinder head 7 is formed of a head liner which includes a head underside portion 11 and a liner upper portion 12 formed integral with the head underside portion 11. The head underside portion 11 has an intake port 17 and an exhaust port 19, in which are installed an intake valve 16 and an exhaust valve 18, respectively. The head underside portion 11 of the combustion chamber member 10 is also formed with a communication port 31 that connects the main combustion chamber 1 and the pre-combustion chamber 2. The pre-combustion chamber member 3 is formed with a communication port 13 aligned with the communication port 31 to connect the main combustion chamber 1 and the pre-combustion chamber 2.

The combustion chamber member 10 is made of beat resisting materials including ceramics such as $Si_3N_4$ and heat resisting alloy and is installed in the cavity 9 of the cylinder head 7 through a gasket 34 to form a heat insulating air layer 36 between the outer circumferential surface of the combustion chamber member 10 and the cavity 9 of the cylinder head 7, thus making the main combustion chamber 1 heat insulative. Further, the pre-combustion chamber member 3 is made of heat resisting materials including ceramics such as $Si_3N_4$ and heat resisting alloy and is installed in the cavity 6 of the cylinder head 7 through a gasket 33 to form a heat insulating air layer 39 between the pre-combustion chamber member 3 and the cavity 6 of the cylinder head 7 to make the pre-combustion chamber 2 heat insulative.

The piston 15 includes a piston head 25 made of heat resisting materials including ceramics such as $Si_3N_4$ and heat resisting alloy and a piston skirt 26 made of a metal such as aluminum alloy and secured to the piston head 25. Between the piston head 25 and the piston skirt 26 a gasket 41 is interposed and a heat insulating air layer 44 is formed. The piston head 25 and the piston skirt 26 are secured together with a fixing ring 29 as by metal flow.

In this engine, in the communication port 31 formed in the head underside portion 11 of the combustion chamber member 10 is installed a control valve 4 that extends through an insertion hole 32 formed in the pre-combustion chamber member 3. The pre-combustion chamber member 3 is formed with a gaseous fuel introducing port 42, in which is installed a fuel valve 5, to supply gaseous fuel into the pre-combustion chamber 2 through a gaseous fuel supply passage 8 formed in the cylinder head 7. The control valve 4 reciprocates and is set to open the communication port 31 near the end of the compression stroke to communicate the pre-combustion chamber 2 to the main combustion chamber 1 and to close the port at the first half of the exhaust stroke at the latest to isolate the pre-combustion chamber 2 from the main combustion chamber 1. The fuel valve 5 is set to open when the communication ports 13, 31 are closed, supplying gaseous fuel from the gaseous fuel supply passage 8 into the pre-combustion chamber 2. The fuel valve 5 installed at the gaseous fuel introducing port 42 is operated to open the gaseous fuel introducing port 42 when the communication ports 13, 31 are closed by the control valve 4. Hence, when the fuel valve 5 opens the gaseous fuel introducing port 42, the gaseous fuel is supplied from the gaseous fuel supply passage 8 through the gaseous fuel introducing port 42 into the pre-combustion chamber 2.

The structure of this combustion chamber is characterized by a pressure reducing chamber member 30 installed in the cylinder head 7 which has a communication port 23 open to the main combustion chamber 1 and which forms a cylinder 40 in which a subpiston 21 urged by a force of a spring 22 is installed to form an air chamber or pressure reducing chamber 20.

The subpiston 21 is formed with ring grooves in which seal rings 43 are installed to hermetically seal the variable displacement pressure reducing chamber 20 from the outside. Further, a wall body 45 made of ceramics or the like is arranged on the outer side of the pressure reducing chamber member 30 to form a heat insulating air layer 44 to make the pressure reducing chamber 20 heat insulative.

In this engine, during the compression stroke of the piston 15 a part of the compressed air in the main combustion chamber 1 is stored in the pressure reducing chamber 20 by displacing the subpiston 21 against the force of the spring and then, during the power stroke of the piston 15, the compressed air stored in the pressure reducing chamber 20 is pushed out or ejected out into the main combustion chamber 1 by activating the subpiston 21 by the spring force. The communication between the pressure reducing chamber 20 and the main combustion chamber 1 is achieved through a communication port 24 formed in the combustion chamber member 10 and through the communication port 23 formed in the pressure reducing chamber member 30. These communication ports are set to be closed by the side surface of the crown portion of the piston 15 during the period from the latter half of the compression stroke of the piston 15 to the first half of the power stroke. Further, the pressure reducing chamber 20 is formed by the pressure reducing chamber member 30 installed in the cylinder head 7. The spring 22 is arranged at the back of the subpiston 21 that slides in the cylinder 40 of the pressure reducing chamber member 30. The pressure reducing chamber member 30 may be formed, as required, with a vent hole open to the outer air on the side where the spring 22 is installed.

In this engine, the gaseous fuel such as natural gas is stored in a gaseous fuel source, such as a gas fuel tank or at gas fuel accumulation chamber (not shown) that accumulates gaseous fuel under pressure. The areas around the communication ports 13, 31 are heated to high temperatures by the burning gas and thus the control valve 4 installed in the communication port 31 should preferably be made of ceramics that have excellent heat resistance, such as silicon nitride and silicon carbide. The fuel valve 5, although it may be activated by an ordinary valve operating mechanism, is driven by a solenoid drive apparatus, which is operated by an electromagnetic force, so that the valve opening period can be controlled according to the engine load. The fuel valve 5 opens the gaseous fuel introducing port 42 to introduce a required amount of gaseous fuel from the gaseous fuel source into the pre-combustion chamber 2.

Next, the operation of this engine will be explained by referring to FIG. 2.

This engine operates by repeating four strokes—intake, compression, power and exhaust strokes. In the intake stroke, the intake valve 16 opens the intake port 17 to supply the intake air into the main combustion chamber 1. With the communication ports 13, 31 closed by the control valve 4, the fuel valve 5 opens the gaseous fuel introducing port 42 to admit the gaseous fuel from the gaseous fuel source through the gaseous fuel supply passage 8 into the pre-combustion chamber 2. At this time, because a small amount of burning gas after combustion remains in the pre-combustion chamber 2, the gaseous fuel, when introduced into the pre-combustion chamber 2, receives heat and becomes activated in the pre-combustion chamber 2.

The engine operation now proceeds to the compression stroke. In the compression stroke, the communication port 13 is closed by the control valve 4. As the piston 15 moves up, the intake air in the main combustion chamber 1 is compressed, raising the compressed air pressure as indicated by the line M. At the same time the compressed air pressure M in the main combustion chamber 1 displaces the subpiston 21 through the communication ports 24, 23 against the force of the spring 22, introducing a part of the compressed air in the main combustion chamber 1 into the pressure reducing chamber 20. In the latter half of the compression stroke, when the piston 15 further moves up and the top surface 35 of the piston 15 moves past the communication port 24 (represented by RC), the communication between the pressure reducing chamber 20 and the main combustion chamber 1 is blocked by the outer circumferential side surface of the piston 15. At this time, the compressed air that has flowed into the pressure reducing chamber 20 suffers no loss due to heat dissipation because the pressure reducing chamber 20 is formed in a heat insulating structure. At this moment, although a small clearance to allow the reciprocating motion of the piston 15 exists between the wall surface of the liner upper portion 12 of the combustion chamber member 10 and the outer circumferential surface of the piston head 25, the rapid reciprocating motion of the piston 15 renders the pressure reducing chamber 20 almost isolated from the main combustion chamber 1. After this, the compressed air in the pressure reducing chamber 20 is stored there at its elevated pressure and the compressed air in the main combustion chamber 1 is further compressed following the line MP as the piston 15 continues to move up. During this compression stroke, the gaseous fuel in the pre-combustion chamber 2 slightly rises in pressure while being activated, as indicated by the line S.

Next, when the piston 15 further moves up and nears the end of the compression stroke where the compressed air in the main combustion chamber 1 is fully compressed (represented by OP), the control valve 4 opens the communication ports 13, 31 allowing the compressed, hot air (650° C. for example) to flow from the main combustion chamber 1 into the pre-combustion chamber 2, with the result that the pressure of the main combustion chamber 1 rapidly decreases and that of the pre-combustion chamber 2 rises suddenly. The compressed air introduced into the pre-combustion chamber 2 mixes with the gaseous fuel and ignites reliably, sending the pressure in the pre-combustion chamber 2 to the maximum pressure Smax. The pressure condition during a general rapid combustion is shown by a dashed curve for reference. Because this engine has the pressure reducing chamber 20, the pressure line M of the main combustion chamber 1 can be kept lower than the pressure line Q of a main combustion chamber without a pressure reducing chamber 20, so that the energy indicated by the shaded area A is not consumed in the form of friction and heat. The pressure in the main combustion chamber in the conventional diesel engine using light oil as a fuel is shown by the dashed line N for reference.

Once the mixture is ignited in the pre-combustion chamber 2, the combustion of the activated mixture in the pre-combustion chamber 2 proceeds smoothly and rapidly propagates to the whole mixture in the pre-combustion chamber 2 in a way that limits the production of NOx because the mixture is rich. Next, in the power stroke, the gases of flame and unburned mixture in the pre-combustion chamber 2 are ejected out through the communication ports 13, 31 into the main combustion chamber 1 where the combustion proceeds involving the air present in the main combustion chamber 1, causing the piston 15 to perform a work, with the pressure in the main combustion chamber 1 falling as indicated by the line ME. Next, when the power stroke passes the point RO where the top surface 35 of the piston head 25 moves past the communication part 24, the communication port 23 of the pressure reducing chamber 20 opens to the main combustion chamber 1 and the force of the spring 22 displaces the subpiston 21 pushing the compressed air stored in the pressure reducing chamber 20 out into the main combustion chamber 1. As the compressed air that was accumulated in the pressure reducing chamber 20 is ejected into the gases of flame and unburned mixture in the main combustion chamber 1, the combustion is accelerated by the additional air pressure blown from the pressure reducing chamber 20, performing the work as indicated by the line MEP, increasing the combustion speed, shortening the combustion period. Thus the combustion is completed in a short period of time. Therefore, when compared with an ordinary engine without the pressure reducing chamber 20, whose main combustion chamber pressure is represented by the pressure line Q, this engine can perform an additional work indicated by the shaded area B by the ejection of air pressure from the pressure reducing chamber 20 and the combustion in the latter half of the power stroke.

As described above, because a part of the compressed air in the main combustion chamber 1 is stored temporarily in the pressure reducing chamber 20 and not all the air in the main combustion chamber 1 is compressed during the compression stroke, it is possible to keep the pressure of compressed air in the main combustion chamber 1 low and prevent energy from being consumed in the form of friction and heat as it would be in the ordinary engine as indicated by the shaded area A. Further, because in the power stroke the force of the spring 22 pushes back the stored compressed air to the main combustion chamber 1, the thermal efficiency in a region indicated by the shaded area B can be improved and the fuel cost reduced. Furthermore, this engine is characterized in that the pre-combustion chamber 2 is provided with the communication ports 13, 31 and the gaseous fuel introducing port 42; that, with the communication port 13 closed by the control valve 4, the gaseous fuel is supplied from the gaseous fuel source through the gaseous fuel introducing port 42 into the pre-combustion chamber 2; and that, with the communication port 13 closed by the control valve 4 to prevent the intake air from being supplied into the pre-combustion chamber 2, the intake air drawn into the main combustion chamber 1 from the intake port 17 is compressed by the rising piston 15 during the compression stroke. Because of these features, when the intake air is compressed to high pressures in the main combustion chamber 1, the gaseous fuel supplied into the pre-combustion chamber 2 will not self-ignite nor cause knocking because it is isolated from the main combustion chamber 1 by the control valve 4. Further, when the communication ports 13, 31 are opened by the control valve 4, the intake air pressurized to a high compression ratio flows from the main combustion chamber 1 into the pre-combustion chamber 2 to mix the fuel gas with the intake air and thereby fire the mixture, resulting in a high-speed combustion of the fuel-rich mixture with a sufficiently high equivalence ratio to suppress the production of NOx and HC.

Next, by referring to FIG. 3 and 4, another embodiment of the combustion chamber structure of an engine according to this invention will be described. In the structure of a combustion chamber shown in FIG. 3, parts identical in configuration and function with the corresponding parts of FIG. 1 are assigned like reference numbers and their explanation will not be repeated.

Figure 3:
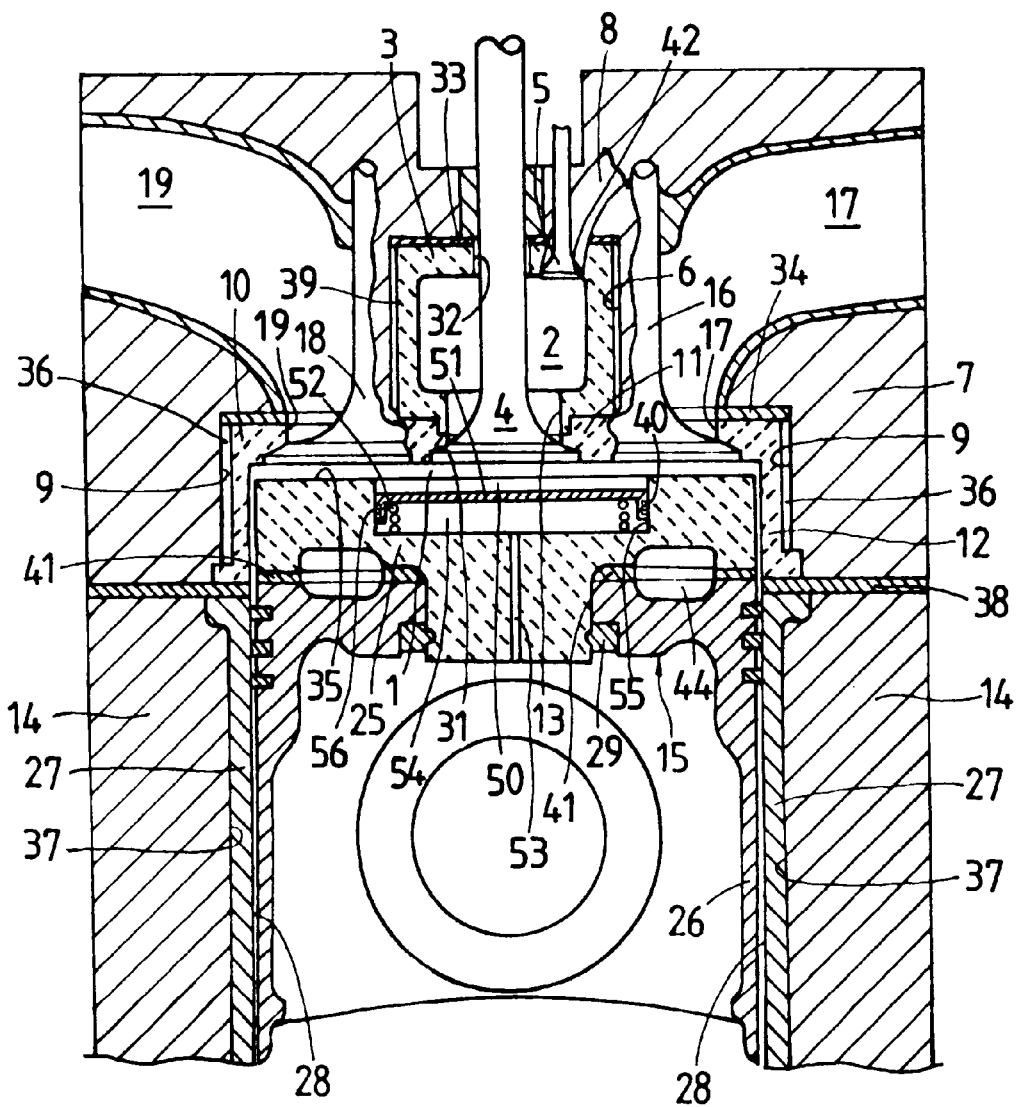
FIG. 3 is a cross section showing another embodiment of the combustion chamber structure in an engine of this invention.
Figure 4:
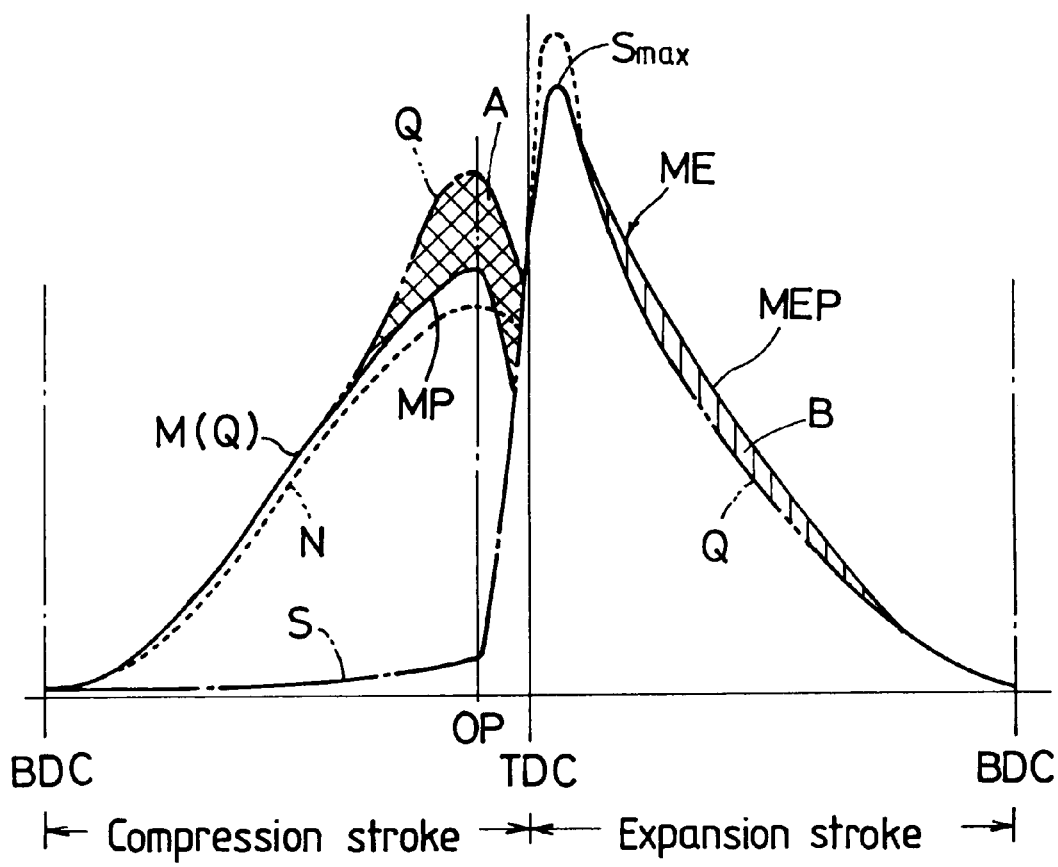
FIG. 4 is a line diagram showing the working of the engine of FIG. 3.

As shown in FIG. 3, the structure of the combustion chamber in this engine is characterized in that a cavity 55 that forms a part of the main combustion chamber 1 is formed in the piston head 25 of the piston 15, that a movable head member 51 supported by a spring force is installed in the cavity 55 to form a displacement-variable main combustion chamber portion 50 whose displacement is varied by the movable head member 51 moving in the cavity 55 in response to the gas pressure in the main combustion chamber 1, and that a spring 52 that elastically supports the movable head member 51 is installed in the cavity 55 at the back of the movable head member 51. During the compression stroke of the piston 15 a part of the compressed air in the main combustion chamber 1 is stored in the displacement-variable main combustion chamber portion 50 by displacing the movable head member 51 against the spring force to expand the displacement of the displacement-variable main combustion chamber portion 50. Then, during the power stroke of the piston 15 the movable head member 51 is pushed back by the spring force to push the compressed air present in the displacement-variable main combustion chamber portion 50 into the main combustion chamber 1.

The movable head member 51 is formed with ring grooves, in which seal rings 56 are fitted. The movable head member 51 opens the displacement-variable main combustion chamber portion 50 to the main combustion chamber 1 and a hollow portion 54 formed in the cavity 55 on the back side of the movable head member 51 is connected to the outside through a gas leakage passage 53 formed in the piston head 25. As the piston 15 moves down during the intake stroke, the gas remaining in the hollow portion 54 leaks out through the gas leakage passage 53, so that the hollow portion 54 is not kept at high pressure, allowing the spring 52 to be compressed to store energy and assuring smooth operation of the movable bead member 51.

The main combustion chamber 1 is made of the combustion chamber member 10 of heat resistant ceramics and formed in a heat insulating structure. The pre-combustion chamber 2 is made of the pre-combustion chamber member 3 of heat resistant ceramics and formed in a heat insulating structure. The movable head member 51 and the spring 52 that elastically supports the movable head member 51 are made of heat resisting ceramics or metal.

Next, the operation of the engine having the combustion chamber of this invention will be explained by referring to FIG. 4. The basic gas engine operation performed by this engine is essentially the same as that shown in FIG. 2.

In this engine, during the compression stroke the control valve 4 closes the communication port 13 and as the piston 15 moves up, the intake air in the main combustion chamber 1 is compressed, raising the air pressure as shown by the line M. At the same time, the compressed air pressure M in the main combustion chamber 1 displaces the movable head member 51 against the force of the spring 52, storing a part of the compressed air of the main combustion chamber 1 in an expanded displacement-variable main combustion chamber portion 50. During the compression stroke, the gaseous fuel in the pre-combustion chamber 2 becomes activated as its pressure rises slightly as shown by the line S.

Next, the piston 15 continues to move up and when it nears the end of the compression stroke (represented by OP) where the air in the main combustion chamber 1 is fully compressed, the control valve 4 opens the communication ports 13, 31, allowing the compressed, hot air (650° C., for example) to flow from the main combustion chamber 1 through the communication ports 13, 31 into the pre-combustion chamber 2, with the result that the pressure in the pre-combustion chamber 2 rapidly increases and the pressure in the main combustion chamber 1 slightly decreases. The compressed air introduced into the pre-combustion chamber 2 mixes with the gaseous fuel, reliably firing the mixture, so that the pressure in the pre-combustion chamber 2 reaches the maximum pressure Smax. The pressure condition during a general rapid combustion is shown by a dashed curve for reference. Because this engine has the displacement-variable main combustion chamber portion 50, the pressure line M of the main combustion chamber 1 can be kept lower than the pressure line Q of a main combustion chamber that is not provided with the displacement-variable main combustion chamber portion 50, so that the energy indicated by the shaded area A is not consumed in the form of friction and heat. The pressure in the main combustion chamber in the conventional diesel engine using light oil as a fuel is shown by the dashed line N for reference.

Once the mixture is ignited in the pre-combustion chamber 2, the combustion of the activated mixture in the pre-combustion chamber 2 proceeds smoothly and rapidly propagates to the whole mixture in the pre-combustion chamber 2 in a way that limits the production of NOx because the mixture is rich. Next, in the power stroke, the gases of flame and unburned mixture in the pre-combustion chamber 2 are ejected out through the communication ports 13, 31 into the main combustion chamber 1 where the combustion proceeds involving the air present in the main combustion chamber 1, causing the piston 15 to perform a work, with the pressure in the main combustion chamber 1 falling as indicated by the line ME. Next, when the piston 15 moves down and the gas pressure in the cylinder 28 becomes smaller than the force of the spring 52, the force of the spring 52 moves the movable head member 51 pushing out the compressed gas stored in the displacement-variable main combustion chamber portion 50 into the main combustion chamber 1. The gas pressure stored in the displacement-variable main combustion chamber portion 50 is utilized to cause the piston 15 to perform the work, speeding up the combustion in the main combustion chamber 1, shortening the combustion period. Thus the combustion is completed in a short period of time. Therefore, when compared with an ordinary engine without the displacement-variable main combustion chamber portion 50, whose main combustion chamber pressure is represented by the pressure line Q, this engine can perform an additional work indicated by the shaded area B by ejecting the gas pressure from the displacement-variable main combustion chamber portion 50 by the movable head member 51.

As described above, because a part of the compressed air in the main combustion chamber 1 is stored temporarily in the displacement-variable main combustion chamber portion 50 and not all the air in the main combustion chamber 1 is compressed during the compression stroke, it is possible to keep the pressure of compressed air in the main combustion chamber 1 low and prevent energy from being consumed in the form of friction and heat as it would be in the ordinary engine as indicated by the shaded area A. Further, because in the power stroke the force of the spring 52 pushes back the stored compressed air to the main combustion chamber 1, the thermal efficiency in a region indicated by the shaded area B can be improved and the fuel cost reduced. Furthermore, this engine is characterized in that the pre-combustion chamber 2 is provided with the communication ports 13, 31 and the gaseous fuel introducing port 42; that, with the communication port 13 closed by the control valve 4, the gaseous fuel is supplied from the gaseous fuel source through the gaseous fuel introducing port 42 into the pre-combustion chamber 2; and that, with the communication port 13 closed by the control valve 4 to prevent the intake air from being supplied into the pre-combustion chamber 2, the intake air drawn into the main combustion chamber 1 from the intake port 17 is compressed by the rising piston 15 during the compression stroke. Because of these features, when the intake air is compressed to high pressures in the main combustion chamber 1, the gaseous fuel supplied into the pre-combustion chamber 2 will not self-ignite nor cause knocking because it is isolated from the main combustion chamber 1 by the control valve 4. Further, when the communication ports 13, 31 are opened by the control valve 4, the intake air pressurized to a high compression ratio flows from the main combustion chamber 1 into the pre-combustion chamber 2 to mix the fuel gas with the intake air and thereby fire the mixture, resulting in a high-speed combustion of the fuel-rich mixture with a sufficiently high equivalence ratio to suppress the production of NOx and HC.

What is claimed is:

1. A combustion chamber structure in engines comprising:
   pre-combustion chamber members installed in a cylinder head and forming pre-combustion chambers and communication ports;
   combustion chamber members forming main combustion chambers communicating with the pre-combustion chambers through the communication ports;
   pistons reciprocating in cylinders forming the main combustion chambers;
   fuel supply passages to supply gaseous fuel to the pre-combustion chambers;
   control valves to open and close the communication ports;
   fuel valves to open and close the fuel supply passages; and
   springs to store in the form of spring forces a part of compressed air pressure produced in the main combustion chambers during the compression stroke;
   wherein the spring forces stored in the springs are applied to the pistons as a work during the power stroke.

2. A combustion chamber structure in engines comprising:
   pre-combustion chamber members installed in a cylinder head and forming pre-combustion chambers and communication ports;
   combustion chamber members forming main combustion chambers communicating with the pre-combustion chambers through the communication ports;

pistons reciprocating in cylinders forming the main combustion chambers;

fuel supply passages to supply gaseous fuel to the pre-combustion chambers;

control valves to open and close the communication ports;

fuel valves to open and close the fuel supply passages; and displacement-variable pressure reducing chambers opening to the main combustion chambers and incorporating subpistons urged by spring forces;

wherein, during the compression stroke, a part of compressed air in the main combustion chambers is stored in the pressure reducing chambers by displacing the subpistons against the spring forces and, during the power stroke, the compressed air in the pressure reducing chambers is ejected into the main combustion chambers by driving the subpistons by the spring forces.

3. A combustion chamber structure in engines according to claim 2, wherein the control valves are set to open the communication ports near the end of the compression stroke and to close the communication ports by the end of the exhaust stroke, and the fuel valves are open when the communication ports are closed to supply the gaseous fuel from the fuel supply passages to the pre-combustion chambers.

4. A combustion chamber structure in engines according to claim 2, wherein communication ports between the pressure reducing chambers and the main combustion chambers are set to be closed by head portion side surfaces of the pistons during a period from the second half of the compression stroke of the pistons to the first half of the power stroke.

5. A combustion chamber structure in engines according to claim 2, wherein the pressure reducing chambers are formed of pressure reducing chamber members installed in the cylinder head and springs are installed at the back of the subpistons adapted to slide in cylinders in the pressure reducing chamber members.

6. A combustion chamber structure in engines according to claim 2, wherein the main combustion chambers are made of the combustion chamber members of heat resisting ceramics and formed in a heat insulating structure, the pre-combustion chambers are made of the pre-combustion chambers members of heat resisting ceramics and formed in a heat insulating structure, and the pressure reducing chambers are formed in a heat insulating structure.

7. A combustion chamber structure in engines comprising:

pre-combustion chamber members installed in a cylinder head and forming pre-combustion chambers and communication ports opening to the pre-combustion chambers;

combustion chamber members forming main combustion chambers communicating with the pre-combustion chambers through the communication ports;

fuel supply passages to supply gaseous fuel to the pre-combustion chambers;

control valves to open and close the communication ports;

fuel valves to open and close the fuel supply passages;

pistons reciprocating in cylinders;

cavities formed in piston heads of the pistons and forming a part of the main combustion chambers;

movable head members installed in the cavities and supported by spring forces; and displacement-variable main combustion chamber portions;

wherein the displacement-variable main combustion chamber portions change their displacements as the movable head members move in the cavities against the spring forces in response to the gas pressures in the main combustion chambers.

8. A combustion chamber structure in engines according to claim 7, wherein, during the compression stroke, the movable head members are moved against the spring forces to expand the displacement-variable main combustion chamber portions to store therein a part of compressed air of the main combustion chambers and, during the power stroke, the compressed air present in the displacement-variable main combustion chamber portions is pushed out into the main combustion chambers by driving the movable head members by the spring forces.

9. A combustion chamber structure in engines according to claim 7, wherein the control valves are set to open the communication ports near the end of the compression stroke and close the communication ports by the second half of the exhaust stroke and the fuel valves are open when the communication ports are closed to supply the gaseous fuel from the fuel supply passages to the pre-combustion chambers.

10. A combustion chamber structure in engines according to claim 7, wherein the movable head members are sealed gas-tightly between them and wall surfaces of the cavities, and gas leakage passages are formed in the piston heads on the back side of the movable head members to leak a gas from hollow portions at the back of the movable head members.

11. A combustion chamber structure in engines according to claim 7, wherein the movable head members are elastically supported by springs installed in the cavities at the back of the movable head members.

12. A combustion chamber structure in engines according to claim 7, wherein the main combustion chambers are formed in a heat insulating structure by the combustion chamber members of heat resisting ceramics and heat insulating layers provided at the back of the combustion chamber members, the pre-combustion chambers are formed in a heat insulating structure by the pre-combustion chamber members of heat resisting ceramics and heat insulating layers provided at the back of the pre-combustion chamber members, and the movable head members and the springs elastically supporting the movable head members are made of heat resisting ceramics or heat resisting metal.

* * * * *